(12) United States Patent
De Marco et al.

(10) Patent No.: US 10,443,643 B2
(45) Date of Patent: Oct. 15, 2019

(54) FASTENING DEVICE WITH HIGH PULL-OUT STRENGTH

(71) Applicant: A. RAYMOND ET CIE, Grenoble (FR)

(72) Inventors: Sébastien De Marco, Saint Pierre de Chartreuse (FR); Jean-François Albaran, Varces (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 15/735,086

(22) PCT Filed: Jun. 21, 2016

(86) PCT No.: PCT/FR2016/051504
§ 371 (c)(1),
(2) Date: Dec. 8, 2017

(87) PCT Pub. No.: WO2016/207531
PCT Pub. Date: Dec. 29, 2016

(65) Prior Publication Data
US 2018/0180083 A1 Jun. 28, 2018

(30) Foreign Application Priority Data
Jun. 23, 2015 (FR) ...................... 15 55739

(51) Int. Cl.
*F16B 21/18* (2006.01)
*B60R 13/02* (2006.01)
(Continued)

(52) U.S. Cl.
CPC ........... *F16B 21/186* (2013.01); *B60J 5/0468* (2013.01); *B60R 13/0206* (2013.01); *B60R 13/0243* (2013.01); *F16B 5/0657* (2013.01)

(58) Field of Classification Search
CPC ........ Y10T 24/309; F16B 21/16; F16B 21/18; F16B 21/186; F16B 5/0657
See application file for complete search history.

(56) References Cited

U.S. PATENT DOCUMENTS 5,451,082 A * 9/1995 Murai ................... E05B 65/523
24/115 G
5,704,100 A * 1/1998 Swan .................... F16B 21/186
24/546

(Continued)

FOREIGN PATENT DOCUMENTS

DE 2104150 A1 8/1971
EP 1493629 A1 1/2005
(Continued)

OTHER PUBLICATIONS

International Search Report for PCT/FR2016/051504 dated Sep. 30, 2016.

(Continued)

*Primary Examiner* — Abigail E Troy
(74) *Attorney, Agent, or Firm* — Dickinson Wright PLLC

(57) ABSTRACT

A fastener device (1) for assembling a first part to a second part is provided. The fastener device comprises: a female element (2) that has an axial cavity (6) presenting a tubular inside surface and that is for engaging on the first part; a male element (3) in the shape of a rod for inserting axially into the cavity (6) and for engaging on the second part; and retention means (4) in the form of a U-shaped clamp that is inserted into a housing (5) of the female element (2), passing transversely through the axial cavity (6), so as to pinch the male element (3) and lock it axially in the cavity (6) of the female element (2); the retention means (4) being provided with anti-twisting means that prevent the a U-shape from (Continued)

twisting in the event of the male element (3) being pulled outwards relative to the female element (2).

12 Claims, 3 Drawing Sheets

(51) Int. Cl.
*F16B 5/06* (2006.01)
*B60J 5/04* (2006.01)

(56) References Cited

U.S. PATENT DOCUMENTS

| | | | |
|---|---|---|---|
| 5,894,641 A | 4/1999 | Hurtz et al. | |
| 5,970,588 A * | 10/1999 | Hurtz | A44B 17/0076 |
| | | | 24/654 |
| 6,317,941 B1 * | 11/2001 | Hamm, Jr. | A44C 7/003 |
| | | | 24/656 |
| 6,389,662 B1 * | 5/2002 | Hamm, Jr. | A44C 7/003 |
| | | | 24/705 |
| 6,557,220 B1 * | 5/2003 | Hamm, Jr. | A44C 7/003 |
| | | | 24/499 |
| 2014/0255089 A1 | 9/2014 | Courtin | |

FOREIGN PATENT DOCUMENTS

| | | |
|---|---|---|
| FR | 2981135 A1 | 4/2013 |
| WO | 9635344 A1 | 11/1996 |

OTHER PUBLICATIONS

International Preliminary Search Report for PCT/FR2016/051504 dated Jun. 12, 2017.
Russian Office Action regarding Application No. 2018102303(003107).

* cited by examiner

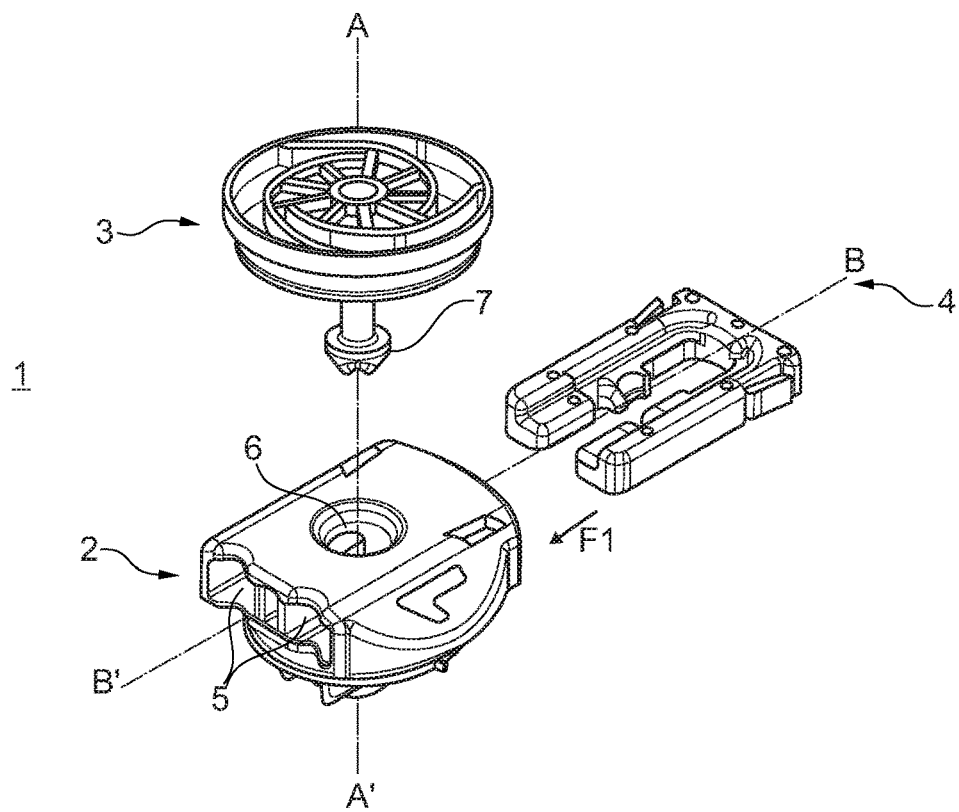
Fig. 1
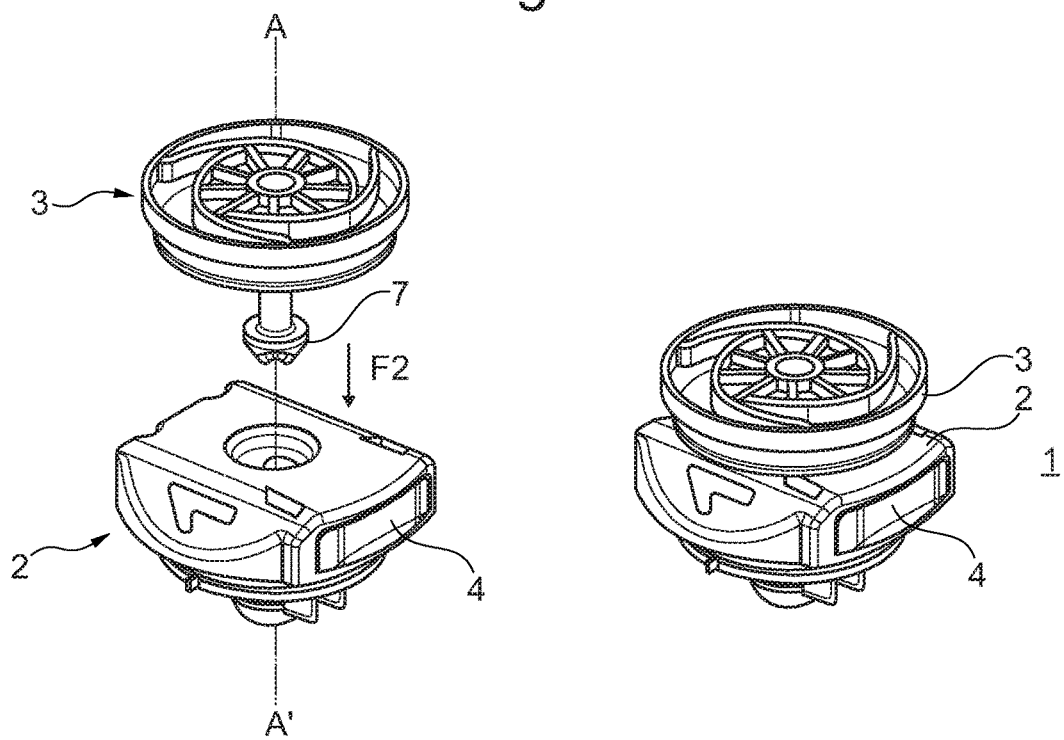
Fig. 2
Fig. 3

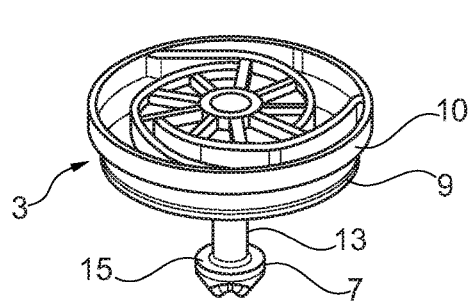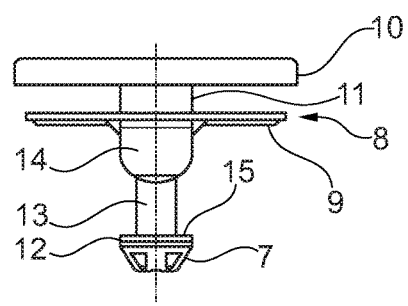
Fig. 4A  Fig. 4B
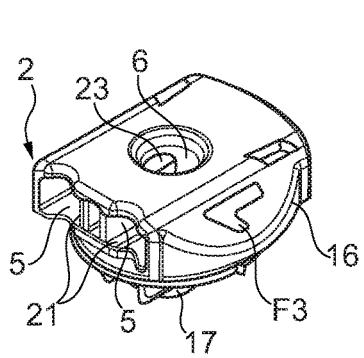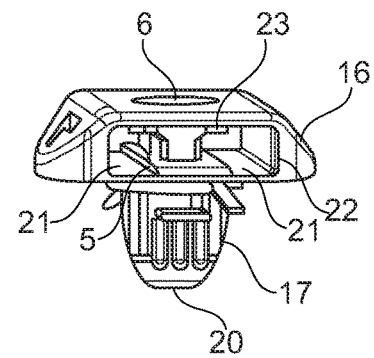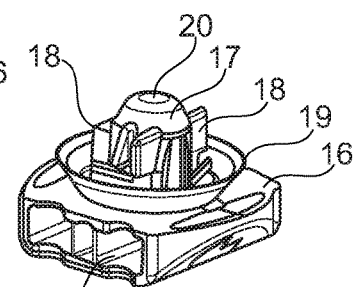
Fig. 5A  Fig. 5B  Fig. 5C
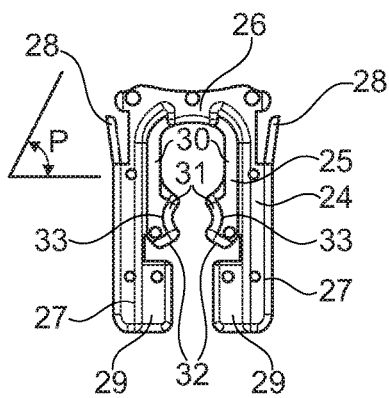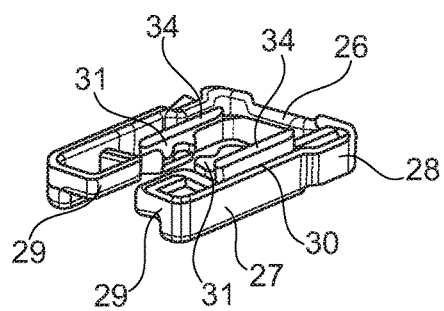
Fig. 6A  Fig. 6B
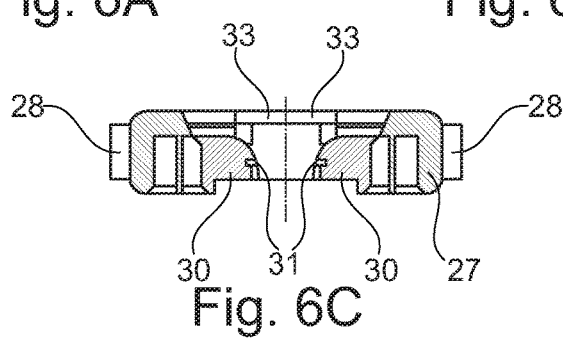
Fig. 6C

FASTENING DEVICE WITH HIGH PULL-OUT STRENGTH

This application is a 371 national phase entry of PCT/FR2016/051504, filed 21 Jun. 2016, which claims the benefit of French Patent Application No. 1555739, filed 23 Jun. 2015, the entire contents of which are incorporated herein by reference for all purposes.

TECHNICAL FIELD

The invention relates to a fastener device for assembling together two parts.

The invention relates more particularly to a fastener device for assembling a first part, e.g. a decor panel for decorating a motor vehicle door, to a second part, e.g. an internal wall of the vehicle door, the fastener device comprising: a female element that has an axial cavity presenting a tubular inside surface and that is for engaging on the first part; a male element that is in the shape of a rod for inserting axially into the cavity and that is for engaging on the second part; and retention means in the form of a U-shaped clamp that is inserted into a housing of the female element, passing transversely through the axial cavity, so as to pinch the male element and lock it axially in the cavity of the female element.

RELATED ART

In the automobile industry numerous techniques are used to assemble together two parts with a fastener device, such as adhesive-bonding, screw-fastening, or using clasps.

In a motor vehicle, the fastener device needs to be a safety member that is positioned at a predetermined location so as to ensure that a door decor panel cannot become separated from the sheet metal of the door wall under the effect of a side impact and then be dangerously expelled into the passenger compartment of the vehicle, in particular when it is situated on the deployment path of an airbag.

By way of example, a fastener device is known comprising a screw having a thread that passes through the internal door decor panel and that is secured to a clasp that is fastened to the wall. The strength of the screw against being torn out from the clasp is often judged to be poor, so the door decor might be expelled into the passenger compartment of the vehicle in the event of an impact.

This is why motor vehicle manufacturers seek to use fastener devices that present good tear-out strength in the event of a side impact.

Clasp and prong based fastener devices satisfy such constraints in part. Each of the clasp and prong elements is incorporated into a respective one of the parts to be assembled together, and assembly can occur by sliding or snap-fastening the prong into a cavity of the clasp. A clasp retaining the prong in its cavity currently presents the best tear-out strength.

Such fastener devices are described in documents EP 1 360 420, U.S. Pat. No. 6,254,302, and EP 1 577 567.

In particular, document FR 2 981 135 presents a fastener device of this type, with a male element for engaging on the panel, and a female element for engaging on the metal wall of the door, the two elements being configured so that the female element can retain the male element with retention means, in the form of a pin, that can be inserted into the female element so as to fasten and retain the male element.

In that fastener device, the pin is a bent wire having ends that form the retention means housed in the female element. The male element is prevented from being removed from the cavity by a shoulder of the male element coming into contact with flexible portions of the pin. Nevertheless, in the event of a side impact, the strong pressure exerted by the shoulder on the flexible portions may cause the flexible portions to twist, causing the male element to be released accidentally from the female element.

Another feature of that pin is that it can be extracted from the female element by a control member, so as to release the male element in order to be able to remove the panel from the wall.

The control member is a loop, formed by the above-mentioned bent wire, that projects from the female element. In that device, in order to remove the pin from the female element, it is necessary to engage a tool in the loop and pull on the pin in order to remove it from the female element.

In order to use the fastener system once more, it is necessary to reposition the pin in the female element by performing a pin insertion step that is not very practical.

Furthermore, when the pin is released from the female element, it may become lost during handling, thus making the fastener device unusable.

Thus, in order to replace one of the elements to be fastened, motor vehicle manufacturers need to develop fastener devices that can easily be reused, undone, and done up again, while being held captive.

That is why manufacturers also tend to seek removable fastener devices, in order to enable parts assembled together by such a device to be changed quickly and easily, if necessary.

SUMMARY

The object of the invention is to remedy those drawbacks while proposing a fastener device with high tear-out strength, and that is discreet, easy, and quick to use.

More particularly, the invention provides a fastener device for assembling a first part to a second part, the fastener device comprising: a female element that has a cavity extending in an axial direction presenting a tubular inside surface and that is for engaging on the first part; a male element that is in the shape of a rod for inserting axially into the cavity and that is for engaging on the second part; and retention means in the form of a U-shaped clamp that is inserted into a housing of the female element, passing transversely through the cavity, so as to pinch the male element and lock it axially in the cavity of the female element; the fastener device being characterized in that the retention means are provided with anti-twisting means that prevent the U-shape from twisting in the event of the male element being pulled outwards relative to the female element, the anti-twisting means comprising at least one first rib that projects in said axial direction from said branch of the U-shape inside the cavity and that comes into abutment against the tubular inside surface of the cavity, so as to prevent the branches of the U-shape from twisting during such pulling.

The fastener device of the invention may also present the following features:

the anti-twisting means further comprise at least one second rib on each branch of the U-shape, which second rib comes into abutment in a groove that is provided in the housing of the female element, so as to prevent the branches of the U-shape from twisting during such pulling;

two first ribs and two second ribs distributed on the two branches of the U-shape of the retention means may advantageously be provided;

the branches of the U-shape of the retention means form serrations that project towards the inside of the U-shape so as to pinch the male element when it is inserted into the cavity of the female element, the first rib projecting substantially perpendicularly to the serrations;

the first rib projects from a first face of the retention means, and the second rib projects from a second face of the retention means that is remote from the first face of the retention means;

the retention means are in the form of two U-shaped clamps with an outer first clamp and an inner second clamp, which first and second clamps present a common base and are interfitted one inside the other in a common plane;

the outer clamp includes flexible U-shaped branches with flexible anti-return blades that slope outwards from the U-shape towards the base of the U-shape, and that come into abutment against recesses, provided in the housing, when the retention means are inserted into the female element;

the retention means is arranged so that in a first insertion position in the female element it retains the male element in the cavity of the female element, and so that in a second insertion position in the female element, which second position is driven further in than the first position, it allows the male element to be removed from the cavity of the female element;

the U-shaped inner clamp includes opposite straight edge segments that allow the male element to pass when said retention means are in the second insertion position in the female element;

the first part is sheet metal inside a motor vehicle door, and the second part is an internal trim panel of a motor vehicle door;

the first part is a window lift mechanism, and the second part is a window of a motor vehicle door; and the female element, the retention means, and the male element are made of molded plastics material.

With this arrangement of the invention, a fastening is obtained for assembling together two parts, such as a panel to a wall, that is detachable but that is also very strong against being torn out.

In the event of a side impact on a door of a motor vehicle, the male element pulls on the female element. The rod of the male element thus exerts an axial force on the branches of the U-shaped clamp of the retention means, which tends to cause the first rib of the anti-twisting means to rise in the cavity of the female element, and then come into abutment against the inside surface of the cavity, which prevents the branches of the U-shape from twisting and also prevents the branches moving away from each other.

Furthermore, the second rib on the other face of the U-shape of the retention means, which comes into abutment in the groove of the housing of the female element, reinforces the ability of the branches of the retention means to withstand twisting as a result of the rib tending to be braced against the groove, and thus holds the U-shape of the retention means flat in the housing of the female element.

Furthermore, the two insertion positions of the retention means in the female element contribute to holding the retention means captive even after an operation of removing the fastening.

With the device of the invention, motor vehicle manufacturers have available a fastener device for fastening a panel to a wall that is easy to use, that can be undone, that cannot be lost, and that provides better tear-out strength in the event of a side impact.

BRIEF DESCRIPTION OF THE DRAWINGS

The present invention can be better understood and other advantages appear on reading the following description and from the accompanying drawings, in which:

FIG. 1 is a perspective view of the three component elements of the fastener device of the invention;

FIG. 2 is a perspective view of the fastener device of the invention with the retention means inserted in the female element in a first insertion position for receiving and retention the male element;

FIG. 3 is a perspective view of the fastener device of the invention with the male element engaged in the female element, the male element being retained in the female element by the retention means that are inserted in the female element in a first insertion position;

FIG. 4A is a perspective view of the male element of the fastener device of the invention;

FIG. 4B is a side view of the male element of the fastener device of the invention;

FIGS. 5A to 5C are perspective views of the female element as seen from above, from the side, and from below respectively;

FIG. 6A is a plan view of the retention means of the fastener device of the invention;

FIG. 6B is a perspective view of the underside of the retention means of the fastener device of the invention;

FIG. 6C is a side view of the retention means of the fastener device of the invention;

DETAILED DESCRIPTION OF EXAMPLE EMBODIMENTS

Figure 7:
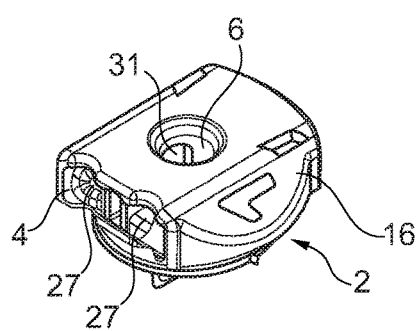
FIG. 7 is another perspective view, as seen from above, of the female element with the retention means inserted in the female element in the first insertion position.

FIG. 1 shows a fastener device 1 of the invention that is adapted to fasten a first part, in this embodiment an internal trim panel of a motor vehicle door, to a second part, in this embodiment an internal sheet metal wall of the door (not shown in the figures).

The fastener device 1 comprises: a female element 2, in this embodiment a hollow clasp that has a cylindrical axial cavity 6 passing therethrough and that is intended to be engaged on the door wall; a male element 3, in this embodiment a prong that is intended to be engaged on the door panel; and retention means 4 or a U-shaped clamp bolt that is used to lock the male element 3 axially in the female element 2.

More particularly, the bolt 4 is arranged so that it is inserted radially (BB') into a housing 5 of the clasp 2 extending transversely to the cylindrical cavity 6, the lock being inserted along arrow F1 starting with the ends of the U-shape such that the branches of the U-shape are positioned on either side of the cavity 6 that passes through the clasp 2.

The prong 3 is inserted axially (AA') into the cavity 6 along arrow F2, as shown in FIG. 2.

FIG. 3 shows the prong 3 being held in position in the clasp 2 by the bolt 4.

The rod-shaped prong 3 is shown in FIGS. 4A and 4B. It generally comprises an anchor 7 and a head 8.

The head 8 is made up of a plate 9, a backing-plate 10, and a spacer 11 that interconnects the plate 9 and the backing-plate 10.

The backing-plate 10 comprises a hub and arms that can be seen in FIG. 4A.

In known manner, the head 8 of the prong 3 is used to engage the prong 3 in the door panel via the hub and the arms.

The anchor 7 of the prong 3 comprises a bullet-shaped tip 12, a rod body 13, and a base 14.

The base 14 is connected to the plate 9 on its face remote from the spacer 11.

The rod body 13 presents a section narrowing that forms a shoulder 15 above the tip 12.

FIGS. 5A to 5C show various perspective views of the clasp 2.

The clasp 2 comprises a hollow body 16 from which a cup 17 extends axially from its bottom face, which cup is of generally cylindrical shape with fins 18 that extend radially from the cylinder of the cup 17.

In known manner, the cup 17 is used to engage the clasp 2 on the wall by inserting the cup 17 axially through an orifice in the wall.

The fins 18 are used as keying means while inserting the cup 17 through the orifice, and also as fastener means for fastening the clasp 2 to the wall after turning the clasp 2 relative to the orifice.

In this embodiment, sealing against dust and water between the clasp 2 and the wall is provided by a skirt 19 in the shape of a flexible umbrella arranged between the body 16 and the cup 17.

In FIG. 5A, the inlet of the cavity 6 can be seen in the top face of the body 16 of the clasp 2.

The cylindrical cavity 6 extends axially through the body 16 of the clasp 2 until it reaches an end wall 20 of the cylindrical cup 17 of the clasp 2. Alternatively, the cavity 6 need not have an end wall and may thus be a through hole.

The cavity 6 presents a diameter that is a little greater than the outline of the shoulder 15 of the anchor 7 of the prong 3.

As can be seen in FIG. 5B, the housing 5 passes radially right through the body 16 of the clasp 2, transversely to the cavity 6.

In this embodiment, the housing 5 is of rectangular section and presents longitudinal grooves 21 that run along the entire length of its bottom face.

The bolt 4 is inserted into the housing 5 of the clasp 2 via an inlet in one of the ends of the housing 5.

The direction of insertion is represented by an orienting arrow F3 on the body 16 of the clasp 2, as can be seen in particular in FIG. 5A.

At the inlet end for inserting the bolt 4 into the housing 5, the housing 5 presents recesses 22 on its walls for retaining the bolt 4 in the clasp 2. The recesses 22 can be seen better in FIGS. 8 and 13.

In the figures, it should be observed that the cavity 6 communicates with the housing 5 via symmetrical radial openings 23.

The bolt 4 is shown in particular in FIGS. 6A to 6C. In this embodiment, the bolt 4 comprises two U-shaped clamps with an "outer" first clamp 24 and an "inner" second clamp 25, which first and second clamps present a common base 26 and are interfitted one inside the other in a common plane P.

The outer clamp 24 is of thickness that corresponds substantially to the rectangular section of the housing 5 of the clasp 2 and has flexible branches 27 of length that corresponds to the length of the grooves 21 of the body 16 of the clasp 2.

Beside the base 26 of the U-shape, the branches 27 present flexible blades 28 that, in their deployed position, slope outwards, towards the base 26 of the U-shape.

At the end of each of the branches 27 of the outer clamp 24 there is a respective inwardly-directed lug 29 that is arranged in the plane of the clamp.

The inner clamp 25 presents flexible branches 30. Each of the branches 30 presents a straight segment projecting from the base 26, followed by a curved segment with serrations 31, such that the serrations 31 on each of the branches 30 face each other.

The serrations 31 are in the shape of circular arcs so as to form jaws that slope in such a manner as to be wider transversely from the top face to the bottom face of the bolt 4.

The facing serrations 31 present a diameter that is smaller than the outline of the shoulder 15 of the anchor 7 of the prong 3.

At their ends, each of the branches 30 of the inner clamp 25 presents a section 32 that slopes towards the inside of the U-shape.

In the embodiment, on the top face of the serrations 31 of each branch, a narrow circularly-arcuate rib 33 projects axially, and on the bottom face of the bolt 4 shown in FIG. 6B, a longitudinal rib 34 can be seen on each of the branches 30 of the inner clamp 25.

In order to pre-mount the bolt 4 in the clasp 2 of the fastener device 1, the ends of the branches 27 of the outer clamp 24 of the bolt 4 are inserted initially into the housing 5 of the body 16 along arrow F1 in FIG. 1 at the insertion-inlet end.

Figure 8:
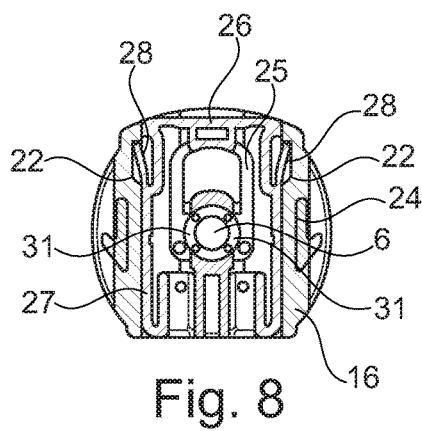
FIG. 8 is a longitudinal section view of the female element with the retention means inserted in the female element in the first insertion position.

The bolt 4 is then pushed radially into the housing 5 until it reaches a first insertion position, shown in FIGS. 7 and 8, in which the ends of the branches 27 of the outer clamp 24 face the body 16 at its end remote from its end for inserting the bolt 4 into the housing 5.

In this first insertion position, the flexible blades 28 of the bolt 4 are in their deployed position in abutment with the recesses 22 in the body 16 of the clasp 2, so as to prevent the bolt 4 from being removed from the housing 5 of the clasp 2.

While the bolt 4 is being pushed into the body 16 of the clasp 2, the sloping sections 32 of the ends of the branches 30 of the bolt 4 encounter a partition upstream from the cavity 6 in the clasp 2.

The sloping shape of the sections 32 helps the bolt 4 to deform elastically.

The branches 30 of the inner clamp 25 move apart, and then back together in the openings 23 so that the bolt 4 is then in the first insertion position in the clasp 2, the serrations 31 of the bolt 4 facing the cavity 6 of the clasp 2, and the serrations forming jaws that project into the cavity 6 through the radial openings 23 in the cavity 6.

It should be observed that the projecting ribs 33 of the serrations 31 do not hinder the insertion of the bolt 4 into the clasp 2, since the total height of a serration 31 with its rib 33 is a little less than the height of the radial openings 23 in the cavity 6.

Figure 9:
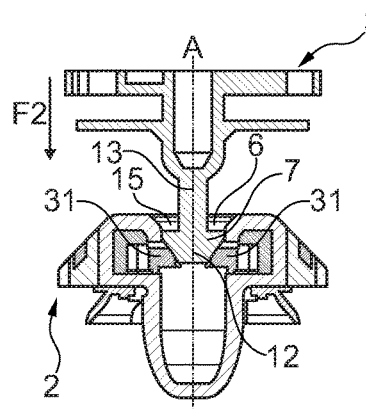
FIG. 9 is an axial section view of the fastener device with the male element in contact with the retention means that are inserted in the female element in a first insertion position.

After inserting the bolt 4 in the clasp 2 in its pre-mounted position, also corresponding to the first position of the bolt 4 in the clasp 2, it is possible to proceed to assembling the panel on the wall by directing the tip 12 of the anchor 7 of the prong 3 towards the cavity 6 of the clasp 2, and by inserting it along arrow F2 in FIG. 2. The panel is thus pushed towards the wall, the bullet-shaped tip 12 coming into contact with the sloping serrations 31 that project into the cavity 6, as shown in FIG. 9.

Under the effect of the pressure of the tip 12 on the serrations 31, the branches 30 move apart from each other, and then when the tip 12 has gone past the serrations 31, the anchor 7 of the prong 3 having been undercut, the branches 30 clamp onto the rod 13 and come to pinch it.

When the prong 3 is pulled outwards relative to the clasp 2, the anchor 7 is prevented from being removed from the cavity 6 by its shoulder 15 coming into abutment against the serrations 31.

It should be observed that the shape of the tip 12 of the anchor 7 and the slope of the serrations 31 enable the anchor 7 to be inserted into the cavity 6 with a relatively large amount of tolerance on the positioning between a panel and a vehicle door wall.

Figure 10:
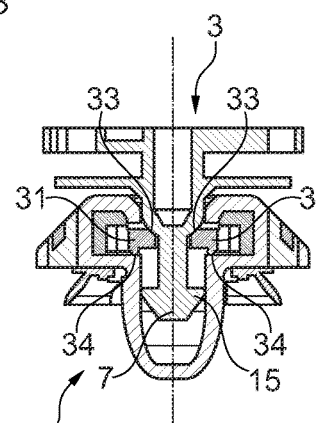
FIG. 10 is an axial section view of the fastener device with the male element retained in the cavity of the female element by the retention means that are inserted in the female element in a first insertion position.

As shown in FIG. 10, the cavity 6 is configured so that the anchor 7 can be driven into it in full.

Thus, between the position in which the anchor 7 is driven into the cavity 6 in full and the position in which it is no longer possible to remove the anchor 7 from the cavity 6, the panel may move away from the wall by a distance of about 5 millimeters (mm) for example.

In this embodiment, the fastener device 1 of the invention is a safety member that is positioned at a predetermined location so as to avoid a panel separating from a wall under the effect of an impact, in particular when it is situated on the deployment path of an airbag.

In this embodiment, the fastener device 1 is capable of withstanding a tearing force that is greater than 100 decanewtons (daN), which is beyond known values of prior-art fastener devices.

This strength against a tearing force is obtained as a result of co-operation between elements of the bolt 4 and of the clasp 2.

In a prior-art fastener device, when the prong 3 is pulled towards the outlet of the cavity 6, e.g. during a side impact, the shoulder 15 of the anchor 7 is thus pressed against the bottom face of the serrations 31 of the bolt 4. Under the effect of this axial force, the sloping serrations 31 may be subjected to twisting stress, and they tend to retract radially towards the rear of the radial openings 23, and they may also twist and no longer retain the prong 3 in the cavity 6 allowing the anchor 7 to pass.

Figure 11:
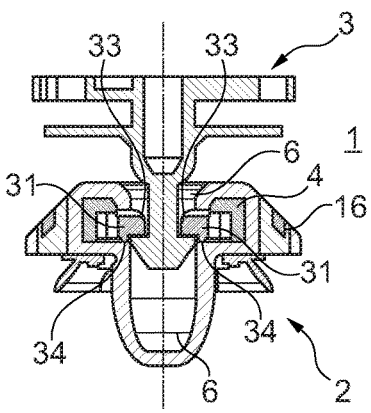
FIG. 11 is an axial section view of the fastener device during an impact, with the male element held in position by the retention means that are inserted in the female element in a first insertion position.

In the invention and as shown in FIG. 11, in the event of side impact, when the shoulder 15 exerts an axial force on the bottom face of the serrations 31 of the bolt 4, the serrations 31 of the flexible branches 30 are pulled axially upwards.

The narrow rib 33 that projects from each top face of the serrations 31 enters into the cavity 6 in abutment with the inside tubular surface of the cavity 6.

The ribs 33 thus serve as anti-twisting means for the U-shaped bolt, since they make it possible to retain each branch of the U-shape flat inside the housing 5, preventing it from twisting.

Furthermore, the bottom ribs 34 of the branches 30 of the inner clamp 25 of the bolt 4 are blocked in the grooves 21 of the housing 5 of the body 16 of the clasp 2, which prevents them from twisting, and which contributes to holding the U-shaped bolt flat in the housing 5.

The ribs 34 on the branches 30 of the inner clamp 25 of the bolt also contribute to ensuring that the branches 30 of the bolt are suitably rigid.

The above-mentioned possibility of moving the panel away from the wall before the shoulder 15 comes against the bottom face of the serrations 31 serves to enable the prong 3 to be released from the clasp 2 so as to make it possible to remove the panel away from the wall.

Figure 12:
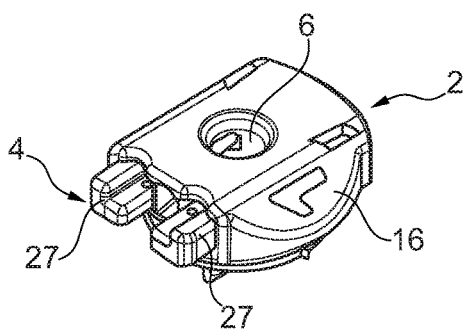
FIG. 12 is a perspective view of the female element with the retention means inserted in the female element in a second insertion position.
Figure 13:
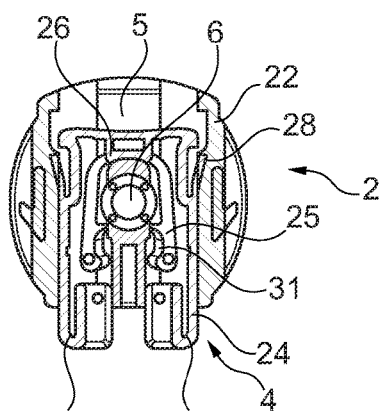
FIG. 13 is a longitudinal section view of the female element with the retention means inserted in the female element in the second insertion position.

Specifically, the offset that exists between the panel and the wall thus makes it possible, in a specific embodiment, to insert a tool for pressing against the bolt 4 at its end with the common base 26, so as to drive it further into the housing 5, still along arrow F1, until the bolt 4 is in a second insertion position in the clasp 2. In this second insertion position, the serrations 31 are no longer facing the cavity 6 of the clasp 2 and can no longer retain the anchor 7 of the prong 3, as shown in FIGS. 12 and 13.

Specifically, while driving the bolt 4 into the housing 5 of the clasp 2, the flexible branches 30 of the inner clamp 25 of the bolt 4 deform in such a manner that the serrations 31 move apart on making contact with the downstream partition of the cavity 6, the bolt 4 being driven in until the common base 26 is in abutment with an upstream partition of the cavity 6, thereby limiting the stroke of the bolt 4 in the clasp 2.

In this second insertion position, the ends of the branches 27 of the outer clamp 24 of the bolt 4 extend beyond the housing 5 of the clasp 2.

The flexible blades 28 of the bolt 4 that are retracted while driving the bolt 4 into the clasp 2, are then in abutment with the walls of the housing 5 of the clasp 2.

In this second insertion position, it is the straight segments between the base 26 of the U-shape and the serrations 31 of the inner clamp 25 of the bolt 4 that face the cavity 6.

In this second insertion position, no obstacle faces the cavity 6, and the prong 3 may be removed without force from the cavity 6 of the clasp 2.

In the above-described embodiment, the bolt 4 is already driven into the clasp 2 in the pre-mounted position (or first position of the bolt 4 in the clasp 2) before the clasp 2 is engaged with the wall, but it would be possible for the clasp 2 to be engaged on its own on the wall, i.e. without the bolt 4 being in its body 16, and the bolt 4 could be inserted into the housing 5 subsequently.

In the invention, starting from the second insertion position of the bolt 4 in the clasp 2, once the prong 3 has been removed from the clasp 2, by pressing radially on the ends of the branches 27 of the outer clamp 24 of the bolt 4 projecting from the housing 5 of the clasp 2 so as to return them into the housing 5, the bolt 4 is returned into the clasp 2 in the first insertion position.

The flexible blades 28 of the bolt 4 are once again in their deployed position in abutment with the recesses 22 of the body 16 of the clasp 2, so as to prevent the bolt 4 from being removed from the housing 5 of the clasp 2.

The bolt 4 in the clasp 2 is thus once again in position to receive, undercut, and retain a prong 3 in the clasp 2.

Consequently, a new panel can be mounted on the wall very quickly.

Naturally, in the above description, the clasp 2 could be engaged with the panel, while the prong 3 could be engaged with the wall.

Naturally, the fastener device of the invention could also be used to fasten other types of parts, e.g. to fasten a window lift mechanism to a window of the motor vehicle.

The various elements of the fastener device of the invention, namely the clasp 2, the prong 3, and the bolt 4, may be made entirely by molding plastics material or by injection-molding plastics material. Such a fastener device may be produced at low cost.

The elements could also be produced additively by a 3D printer for small scale production.

The invention claimed is:

1. A fastener device for assembling a first part to a second part, the fastener device comprising:
    a female element that has a cavity extending in an axial direction and passing through said female element and presenting a tubular inside surface and that is for engaging on said first part;
    a male element that is in the shape of a rod for inserting axially into said cavity and that is for engaging on said second part; and
    retention means in the form of a U-shaped clamp that presents first branches and that is inserted into a housing of said female element, passing transversely to said cavity, so as to pinch said male element and lock said male element axially in said cavity of said female element;
    said retention means are provided with anti-twisting means that prevent the U-shape of said clamp from twisting in the event of said male element being pulled outwards relative to said female element, the anti-twisting means comprising at least one first rib that projects in said axial direction from at least one of said first branches of said U-shape inside said cavity and that comes into abutment against said tubular inside surface of said cavity, so as to prevent at least one of said first branches of said U-shape from twisting during a pulling of said male element outwards relative to said female element.

2. The fastener device according to claim 1, wherein said anti-twisting means further comprise at least one second rib on each first branch of said U-shape, wherein said at least one second rib comes into abutment in a groove that is provided in said housing of said female element, so as to prevent said first branches of said U-shape from twisting during said pulling of said male element outwards relative to said female element.

3. The fastener device according to claim 2, wherein said anti-twisting means comprise two of said at least one first ribs and two of said at least one second rib distributed on said first branches of said U-shape of said retention means.

4. The fastener device according to claim 2, wherein said at least one first rib projects from a first face of said retention means, and said at least one second rib projects from a second face of said retention means that is remote from said first face of said retention means.

5. The fastener device according to claim 1, wherein said first branches of said U-shape of said retention means form serrations that project towards an inside of said U-shape so as to pinch said male element when said male element is inserted into said cavity of said female element, said at least one first rib projecting substantially perpendicularly to said serrations.

6. The fastener device according to claim 1, wherein said retention means are in the form of a double U-shaped clamp with an outer first clamp and an inner second clamp, wherein said first and second clamps present a common base and are interfitted one inside the other in a common plane.

7. The fastener device according to claim 6, wherein said outer clamp includes U shaped second branches that are flexible with flexible anti-return blades that slope outwards from the U-shape towards said base of the U-shape, and that come into abutment against recesses, provided in said housing, when said retention means are inserted into said female element.

8. The fastener device according to claim 1, wherein said retention means is arranged so that in a first insertion position of said clamp in said female element said retention means retains said male element in said cavity of said female element, and said retention means is arranged so that in a second insertion position of said clamp in said female element, wherein in said second position said clamp is driven further in said female element than in said first position, said retention means allows said male element to be removed from said cavity of said female element.

9. The fastener device according to claim 8, wherein said U-shaped inner clamp includes opposite straight edge segments that allow said male element to pass when said retention means are in said second insertion position in said female element.

10. The fastener device according to claim 1, wherein said first part is sheet metal inside a motor vehicle door, and said second part is an internal trim panel of said motor vehicle door.

11. The fastener device according to claim 1, wherein said first part is a window lift mechanism, and said second part is a window of a motor vehicle door.

12. The fastener device according to claim 1, wherein said female element, said retention means, and said male element are made of molded plastics material.

* * * * *